UNITED STATES PATENT OFFICE.

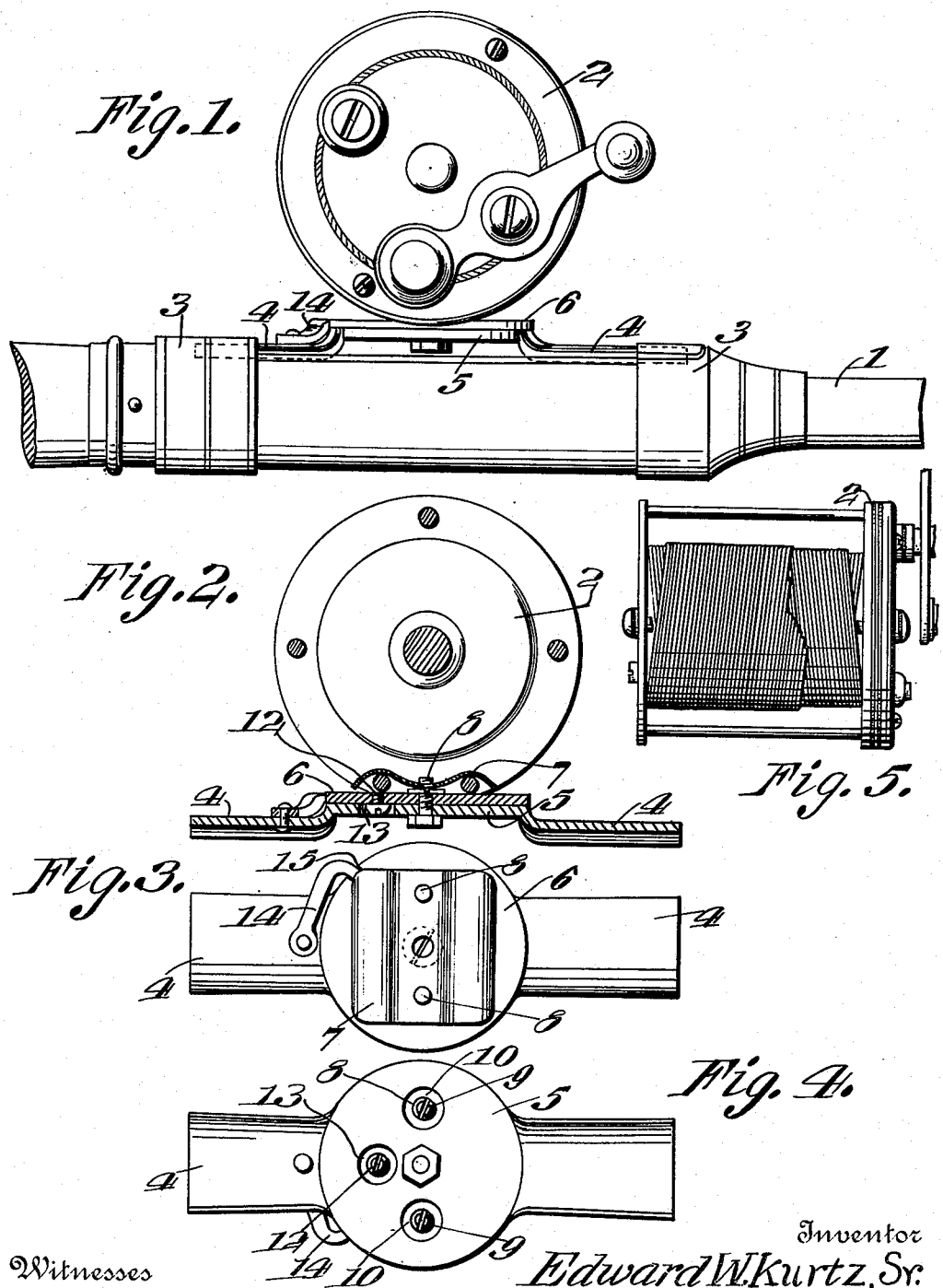

EDWARD W. KURTZ, SR., OF CHICAGO, ILLINOIS.

ATTACHING DEVICE FOR FISHING-LINE REELS.

No. 923,664.            Specification of Letters Patent.            Patented June 1, 1909.

Application filed November 30, 1908. Serial No, 465,060.

*To all whom it may concern:*

Be it known that I, EDWARD W. KURTZ, Sr., a citizen of the United States, residing at Chicago, in the county of Cook and State of Illinois, have invented certain new and useful Improvements in Attaching Devices for Fishing-Line Reels; and I do declare the following to be a full, clear, and exact description of the invention, such as will enable others skilled in the art to which it appertains to make and use the same.

This invention relates to improvements in attaching devices for fishing line reels.

The object of the invention is to provide an attaching means for reels whereby a line when being reeled or wound up will be cross laid or wound, thus preventing the layers of the line from "cutting" under the other layers of the line, or wound so that when the line is unwound, there will be no binding or catching, and consequent backlashing when casting.

A further object is to provide an attachment of this character which is simple and inexpensive in construction, efficient in operation and by means of which any form of reel may be attached to a pole to operate in the manner described.

With these and other objects in view, the invention consists of certain novel features of construction, combination and arrangement of parts as will be described and particularly pointed out in the appended claims.

In the accompanying drawing, Figure 1 is a side view of a portion of the pole having a reel attached thereto in accordance with my invention; Fig. 2 is a vertical sectional view; Fig. 3 is a plan view of the reel-attaching device; Fig. 4 is a similar view of the reverse side of the attaching device, and Fig. 5 is a plan view of the reel showing the cross laid winding of the line.

Referring more particularly to the drawings, 1 denotes the fishing rod, and 2, denotes the reel, which may be of any desired construction. The rod is provided with the usual attaching ferrules, 3, which are adapted to be slidably engaged with the tapered end of segmental plates, 4, which are preferably formed integral with and project in opposite directions from a base plate, 5, as shown.

Pivotally mounted on the base plate, 5, is an attaching disk or plate, 6, on which is arranged a reel fastening clip, 7, said clip being bent to form parallel grooves or channels which are adapted to receive two of the cross bars of the reel and to clamp the same into engagement with the outer side of the attaching plate. The clip is secured to the plate, 6, by means of fastening screws, 8, the heads, 9, of which project beyond the inner side of the plate, 6, and are seated in apertures, 10, in the base plate and form stops which are adapted to limit the rotary movement of the attaching disk or plate, 6, on the base plate. The rotary or pivotal movement of the attaching disk is further limited by a stop screw, 12, arranged in the rear side of the attaching plate and having its head in engagement with an aperture 13 formed in the base plate, as shown.

Pivotally mounted on one of the curved attaching plates, 4, is a locking dog or pawl, 14, the end of which is adapted to engage with a notch or recess, 15, formed in one edge of the attaching plate, 6, whereby said plate is held against movement and is locked in engagement with the base plate.

By means of an attaching device constructed as herein shown and described, the reel is caused to oscillate or rock back and forth laterally on the pole as the line is being wound thereon, thereby causing the line to cross-wind on the reel, which will prevent any cutting under of the line with the layers or strands already wound so that when the line is unreeled, as in casting, there will be no catching or binding of the line and consequent backlashing, the cross laying or winding causing the line to unreel freely and readily.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim as new and desire to secure by Letters-Patent, is:

1. An attaching device for fishing line reels comprising a base plate, an attaching plate pivotally mounted on said base plate, means to limit the pivotal or rotary movement of the attaching plate on the base plate, and a reel attaching clip secured to said attaching plate, said clip having formed therein parallel grooves or channels adapted to receive the cross bars of the reel whereby the latter is rigidly secured to said plate.

2. An attaching device for fishing line reels comprising a base plate having formed therein a series of apertures, an attaching plate pivotally mounted on said base plate, a series of stop screws arranged in said attaching plate and having their heads in engagement with the apertures in said base plate whereby the movement of the attaching plate is limited, and a reel fastening clip secured to said attaching plate.

3. A reel attaching device comprising a base plate having formed therein a series of apertures, oppositely-projecting pole-engaging fastening plates on said base plate whereby the latter is secured to a pole, an attaching plate pivotally mounted on said base plate, a reel fastening clip whereby a reel is secured to said attaching plate, and screws arranged in said attaching plate to secure said clip thereto, said screws having heads arranged in the apertures of said base plate to form stops whereby the pivotal or rotary movement of the attaching plate is limited.

In testimony whereof I have hereunto set my hand in presence of two subscribing witnesses.

EDWARD W. KURTZ, Sr.

Witnesses:
WILBUR KURTZ,
CHAS. L. KURTZ.